US012744341B2

(12) United States Patent
Kottur

(10) Patent No.: US 12,744,341 B2
(45) Date of Patent: Sep. 22, 2026

(54) TERMINAL SOCKET, TERMINAL PIN, TERMINAL SYSTEM, AND TERMINAL ASSEMBLY

(71) Applicant: TE Connectivity India Private Limited, Bangalore (IN)

(72) Inventor: Shantraj Kottur, Bangalore (IN)

(73) Assignee: TE CONNECTIVITY INDIA PRIVATE LIMITED, Bangalore (IN)

( * ) Notice: Subject to any disclaimer, the term of this patent is extended or adjusted under 35 U.S.C. 154(b) by 297 days.

(21) Appl. No.: 18/460,556

(22) Filed: Sep. 3, 2023

(65) Prior Publication Data

US 2024/0079811 A1 Mar. 7, 2024

(30) Foreign Application Priority Data

Sep. 5, 2022 (IN) ............................. 202241050566

(51) Int. Cl.

*H01R 13/11* (2006.01)
*H01R 12/58* (2011.01)
*H01R 13/639* (2006.01)

(52) U.S. Cl.

CPC ........... *H01R 13/114* (2013.01); *H01R 12/58* (2013.01); *H01R 13/639* (2013.01)

(58) Field of Classification Search

None
See application file for complete search history.

(56) References Cited

U.S. PATENT DOCUMENTS

| | | | | |
|---|---|---|---|---|
| 2,965,147 A * | 12/1960 | Hoffman | .............. | H01R 43/058 29/862 |
| 4,550,972 A | 11/1985 | Romak | | |
| 5,088,942 A | 2/1992 | Welsh et al. | | |
| 6,004,172 A * | 12/1999 | Kerek | .................... | H01R 13/04 439/879 |

(Continued)

FOREIGN PATENT DOCUMENTS

| | | |
|---|---|---|
| CN | 106129676 A | 11/2016 |
| JP | H05182711 A | 7/1993 |

(Continued)

OTHER PUBLICATIONS

Office Action for corresponding JP Application No. 2023140673, dated Nov. 19, 2024 (12 pages).

(Continued)

*Primary Examiner* — Ross N Gushi
(74) *Attorney, Agent, or Firm* — Jay J. Hoette; Carroll, Hoette & Butscher, LLC

(57) ABSTRACT

A terminal socket for an electrical terminal system configured to be mated with a terminal pin along a mating direction includes a wiring portion and an electrical contacting portion having a main body with a hollow space for receiving the mating terminal pin, wherein the main body has an external shape not showing a twofold rotational symmetry in a plane perpendicular to the mating direction, and in that the hollow space does not show a twofold rotational symmetry in said plane, or in that the main body has an external shape comprising a triangularly shaped portion, in particular triangularly shaped in a plane perpendicular to the mating direction. A terminal system uses the terminal socket and a terminal pin and a connector uses the terminal sockets in a housing.

19 Claims, 8 Drawing Sheets

(56) References Cited

U.S. PATENT DOCUMENTS

| | | | | |
|---|---|---|---|---|
| 6,231,387 | B1 * | 5/2001 | Kameyama | H01R 9/05 439/578 |
| 6,305,992 | B1 * | 10/2001 | Bouda | H01R 13/113 439/834 |
| 11,431,142 | B2 * | 8/2022 | Kondo | H01R 43/28 |
| 2006/0035538 | A1 * | 2/2006 | Suemitsu | H01R 13/113 439/852 |

FOREIGN PATENT DOCUMENTS

| | | | |
|---|---|---|---|
| JP | H08213082 | A | 8/1996 |
| JP | 2000357566 | A | 12/2000 |
| JP | 4577194 | B2 | 11/2010 |
| WO | 2009016243 | A2 | 2/2009 |

OTHER PUBLICATIONS

Office Action for corresponding JP Application No. 2023140673, dated May 13, 2025 (7 pages).
Office Action for corresponding KR Application No. 952025117902665 dated Dec. 3, 2025 (11 pages).

* cited by examiner

TERMINAL SOCKET, TERMINAL PIN, TERMINAL SYSTEM, AND TERMINAL ASSEMBLY

CROSS REFERENCE TO RELATED APPLICATIONS

This application claims the benefit of IN Application No. 202241050566, filed on 5 Sep. 2022, the subject matter of which is herein incorporated by reference in its entirety.

BACKGROUND OF THE INVENTION

The subject matter herein relates to a terminal socket for an electrical terminal system and further relates to a terminal pin, a terminal system, a connector and an assembly thereof.

Electrical terminal systems are known in the art that include a terminal socket and a mating terminal pin. The terminal socket comprises a hollow space with electrical contacting portions. When the mating terminal pin is received in the hollow space and engages the electrical contacting portions, the terminal system is assembled and establishes an electrical connection. Such a terminal socket is used, in one example, in a female connector, or receptacle connector, of a printed circuit board (PCB) connector system. The female connector is configured to be mated with a PCB header, also called pin header, tab header, or header connector, to provide a plurality of electrical signaling access points to the electronic circuitry of the PCB. In another example, such a terminal socket can be used in an inline connector system.

Such an electrical terminal system known in the art will be described with reference to FIGS. 1A to 1D. FIG. 1A shows a schematic perspective view of a prior art terminal socket P1 that can be mated along the mating direction x with a mating terminal pin P101 as illustrated in FIG. 1C. FIG. 1D shows schematically a rear view of a female connector housing P201 known in the art, with two rows RA, RB slots P3, for terminal sockets P1 as illustrated in FIG. 1A. The terminal sockets P1 in row A are rotated by 180° with respect to the terminal sockets P1 in row B.

The terminal socket P1 comprises a wiring portion P3 with a wire crimp portion P3*a* and insulation crimp portion P3*b* for attaching an electrically conducting wire. It further comprises an electrical contacting portion P5 for establishing an electrical contact with the terminal pin P101. The electrical contacting portion P5 comprises a main body P7 extending from the wiring portion P3 along the mating direction x.

The terminal pin P101 comprises a rear portion P103 to be connected to a wire and an electrical contacting portion P105 that enters into the terminal socket P1 to realize the electrical connection. The rear portion P103 is connected to a wire or is used to establish connection on to a PCB. The electrical contacting portion P105 comprises a pointed tip P107 and a body P109 shaped to have a rectangular cross-section in a plane perpendicular to the mating direction x. In particular, the body P109 is fully rectangularly shaped.

FIG. 1B shows a frontal view of the main body P7, as viewed in the direction opposed to the mating direction x and defining a hollow space P9 for receiving the mating terminal pin P101 through an opening P11. Further, the main body P7 comprises a polarizing space P13 next to the hollow space P9. A separating wall P15 separates the two spaces. The polarizing space P13 has a right-angled trapezoidal cross-section in a plane y-z. As the terminal socket is stamped from stock, the outer shape of the terminal socket roughly has a combination of a rectangle and a trapeze as its outer shape.

Two contact bulges P17*a*, P17*b* facilitate mechanical engagement and electrical contact with the terminal pin P101. The main body P7 further comprises a locking lance portion P21 protruding elastically outwardly from the main body P7 and used to lock the terminal socket in the connector housing.

The cross-section of the opening P11 and the hollow space P9 in y-z are essentially rectangular for receiving the pin P101 having a rectangular shaped cross-section.

Due to the asymmetric outer shape, the terminal socket P1 can only be introduced in one and only one orientation with respect to the connector housing P201. The polarizing space P13 thus provides a so-called polarizing feature to the terminal socket P1, according to which the installation of the terminal socket P1 in the connector housing P201 is fool proofed. The correct orientation allows for example the locking lance portion P21 to correctly lock the terminal socket P1 in a corresponding locking recess in the connector housing P201. It also allows to correctly guide the terminal pin P101 during mating, and to prevent damage to the locking lance portion P21 in case the terminal socket P1 is inserted wrongly into the connector housing P201.

In the quest for reducing more and more the size of the electronic components, there is a need for a terminal socket that is reduced in size compared to the prior art without compromising the design with respect to an unwanted wrongful upside down insertion of the terminal socket in the corresponding connector housing.

BRIEF DESCRIPTION OF THE INVENTION

In one embodiment, a terminal socket for an electrical terminal system configured to be mated with a terminal pin along a mating direction is provided. The terminal socket includes a wiring portion and an electrical contacting portion, the electrical contacting portion including a main body with a hollow space for receiving the mating terminal pin. The main body has an external shape having a triangularly shaped portion triangularly shaped in a plane perpendicular to the mating direction.

In another embodiment, a terminal socket for an electrical terminal system configured to be mated with a terminal pin along a mating direction is provided. The terminal socket includes a wiring portion and an electrical contacting portion, the electrical contacting portion including a main body with a hollow space for receiving the mating terminal pin. The main body has an external shape not showing a twofold rotational symmetry in a plane perpendicular to the mating direction, and in that the hollow space does not show a twofold rotational symmetry in said plane.

In a further embodiment, a terminal system is provided including a terminal socket including a wiring portion and an electrical contacting portion, the electrical contacting portion including a main body with a hollow space, wherein the main body has an external shape having a triangularly shaped portion triangularly shaped in a plane perpendicular to the mating direction, and a mating terminal pin received in the hollow space and configured to be mated with the terminal socket.

In another embodiment, a connector is provided including a connector housing having slots and a plurality of terminal sockets received in the corresponding slots. Each terminal socket includes a wiring portion and an electrical contacting portion configured to be mated with a terminal pin along a mating direction, the electrical contacting portion including a main body with a hollow space for receiving the mating terminal pin, wherein the main body has an external shape having a triangularly shaped portion triangularly shaped in a plane perpendicular to the mating direction.

DETAILED DESCRIPTION OF THE INVENTION

Figure 2A:
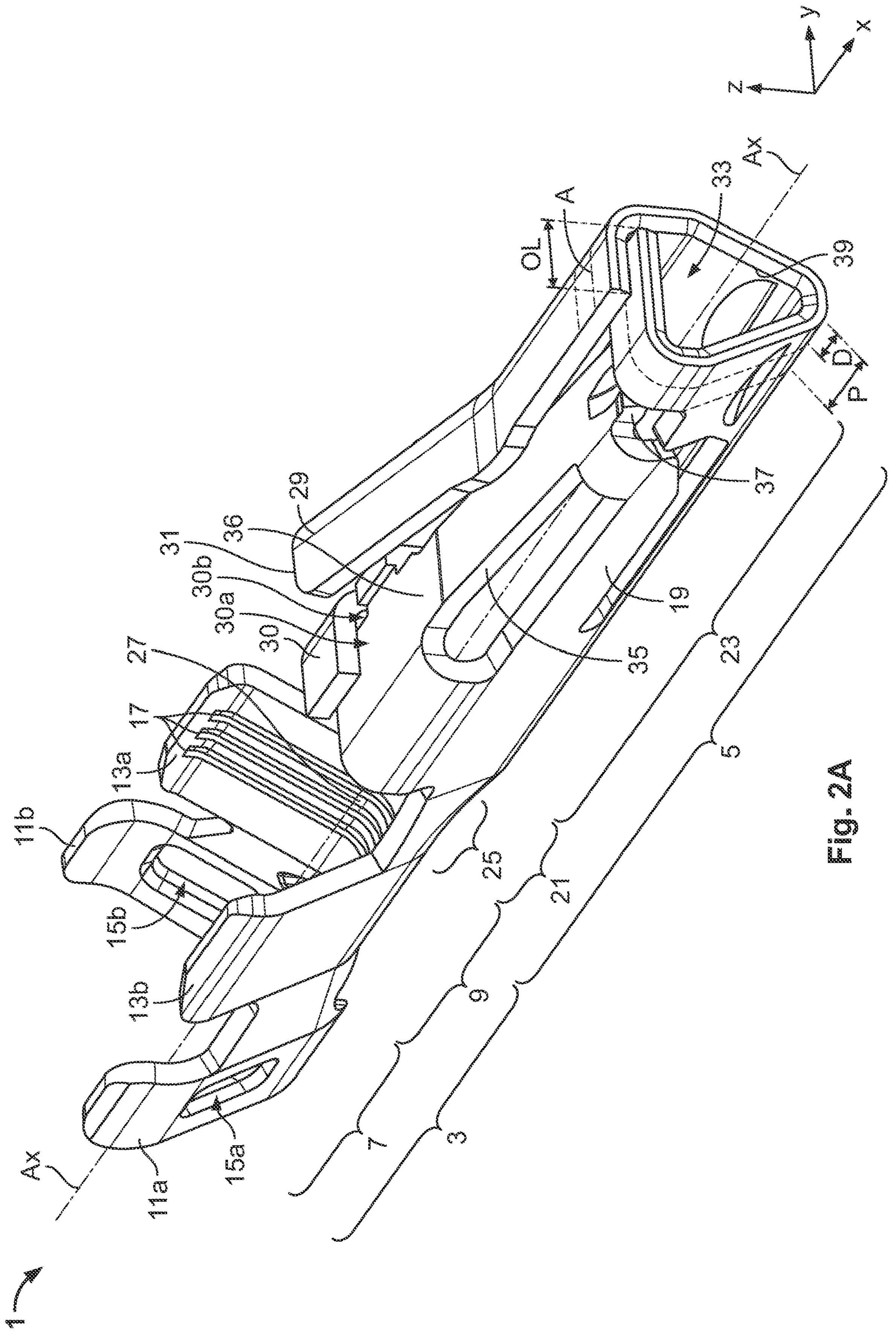
FIG. 2A shows a perspective view of a terminal socket in accordance with embodiments herein.

A terminal socket according to a first embodiment of the invention will now be described with reference to FIG. 2A of the drawings. FIG. 2A shows a perspective view of a terminal socket 1 extending along a mating direction x, the mating direction x being the direction along which the terminal socket and a mating terminal pin are connected, for example by moving with the mating terminal pin in negative x direction. The terminal socket 1 and a mating terminal pin, for example the terminal pin 101 of FIG. 2C, constitute an electrical terminal assembly according to the invention, which can be used, for example, in a printed circuit board connector system or in an inline connector system.

The terminal socket 1 comprises a wiring section 3 and an electrical contacting portion 5. The wiring portion 3 is disposed on the side of the terminal socket 1 opposed to the mating direction x, and comprises an insulation crimp portion 7 and a wire crimp portion 9.

The insulation crimp portion 7 comprises lateral wings 11*a*, 11*b* configured to be crimped on an insulated part of an insulated electrical wire. The wire crimp portion 9 comprises crimp arms 13*a*, 13*b* configured to be crimped on an uninsulated end portion of the insulated wire. The lateral wings 11*a*, 11*b* can comprise cut-out openings 15*a*, 15*b* to facilitate the bending of the lateral wings 11*a*, 11*b*. The crimp arms 13*a*, 13*b* can comprise a rugged structure formation, like here three parallel notches 17 perpendicular to the mating direction x, to improve crimping effectiveness with respect to electrical contact conductance. Preferably, the wire crimp portion 9 is plated with a noble metal, preferably silver or selenium to improve electrical contact with of the socket 1 with uninsulated end portion of the wire.

The electrical contacting portion 5 is disposed on the side of the terminal socket 1 facing in the mating direction x and comprises a main body 19 having a first end 21 and a second end 23. The first end 21 comprises a bridge section 25 next to the wiring portion 3. The bridge section 25 is narrowed with respect to the main body 19, so as to form a gap 27 between main body 19 and the wiring section 3. The gap 27 can accommodate a lock feature from a connector housing in which the socket 1 is house. This provides resistance against the removal of the socket 1 from the connector housing and helps the locking of the socket 1 in the connector housing. Thus, the gap 27 represents a secondary lock area which complements the primary locking feature, that is, the locking lance 29.

The second end 23 comprises the locking lance 29. The locking lance 29 is a portion of the main body 19 that is bent away from the main body 19 extending essentially along a mating axis Ax parallel to the mating direction x, in particular bent away from the mating direction x partially towards to a direction z perpendicular to the mating direction x such that locking lance 29 extends obliquely to the mating direction x. The locking lance 29 comprises a free distal end 31 which provides leverage for the elastic bending of the locking lance 29 from its oblique resting position back towards main body 5, in a direction opposed to the direction z. The locking lance 29 facilitates the locking go the socket 1 in a slot of a matching connector housing, such as the connector housings described with reference to FIGS. 5A and 5B. For example, when the socket 1 is inserted in the connector housing along a mating direction x, the locking lance 29 can be elastically bent downwards, i.e. in a direction opposed to the mating direction x, to fit the opening, and then relax into a corresponding recess to establish a form fit connection.

In this embodiment, the terminal socket 1 can have a length along the mating direction x of less than 20 mm, in particular less than 15 mm, and preferably less than 10 mm. For example, the terminal socket 1 can be dimensioned to conduct maximum peak currents of up to 3 A. Further, the entire terminal socket 1 can be a monolithic body stamped from a metal sheet or stock, in particular stamped from a metal like aluminium or copper or an alloy, in particular a copper based alloy like copper-nickel-silicon-manganese alloy for improved conductance and corrosion-resistance properties. In this embodiment, the terminal socket 1 is stamped from stock having a thickness of 0.12 mm.

The first end 21 of the main body 19 also comprises a rear bent portion 30. The rear bent portion 30 is a portion of a first end of the metallic sheet, from which the terminal socket 1 is stamped, that was bent over a second end of the metallic sheet, thus overlapping over a portion of the metallic sheet. The rear bent portion 30 contributes to the structural robustness of the terminal socket 1 by adding a form fit function to the bending together of ends of the metallic sheet. The rear bent portion 30 thus counteracts forces risking to plastically deform the socket 1.

In a variant, to further enhance the structural robustness of the socket 1, the rear bent portion 30 can additionally be welded, in particular laser beam welded, to the portion of the metallic sheet over which it overlaps. For example, the area 30*a* can be welded shut by welding together the rear bent portion 30 with the portion of the metallic sheet over which the rear bent portion 30 overlaps.

In a different variant, the first end 21 of the main body 19 does not comprise the rear bent portion 30, or any equivalent rear bent portion, and is instead welded shut in the area in which extremities of the bent metal sheet meet. For example, the rear bent portion 30 shown in FIG. 2A is omitted and instead the main body 19 is welded shut in the area 30*b*. This provides the sought structural robustness of the main body 19 which reducing the overall needed quantity of metallic sheet.

Figure 2B:
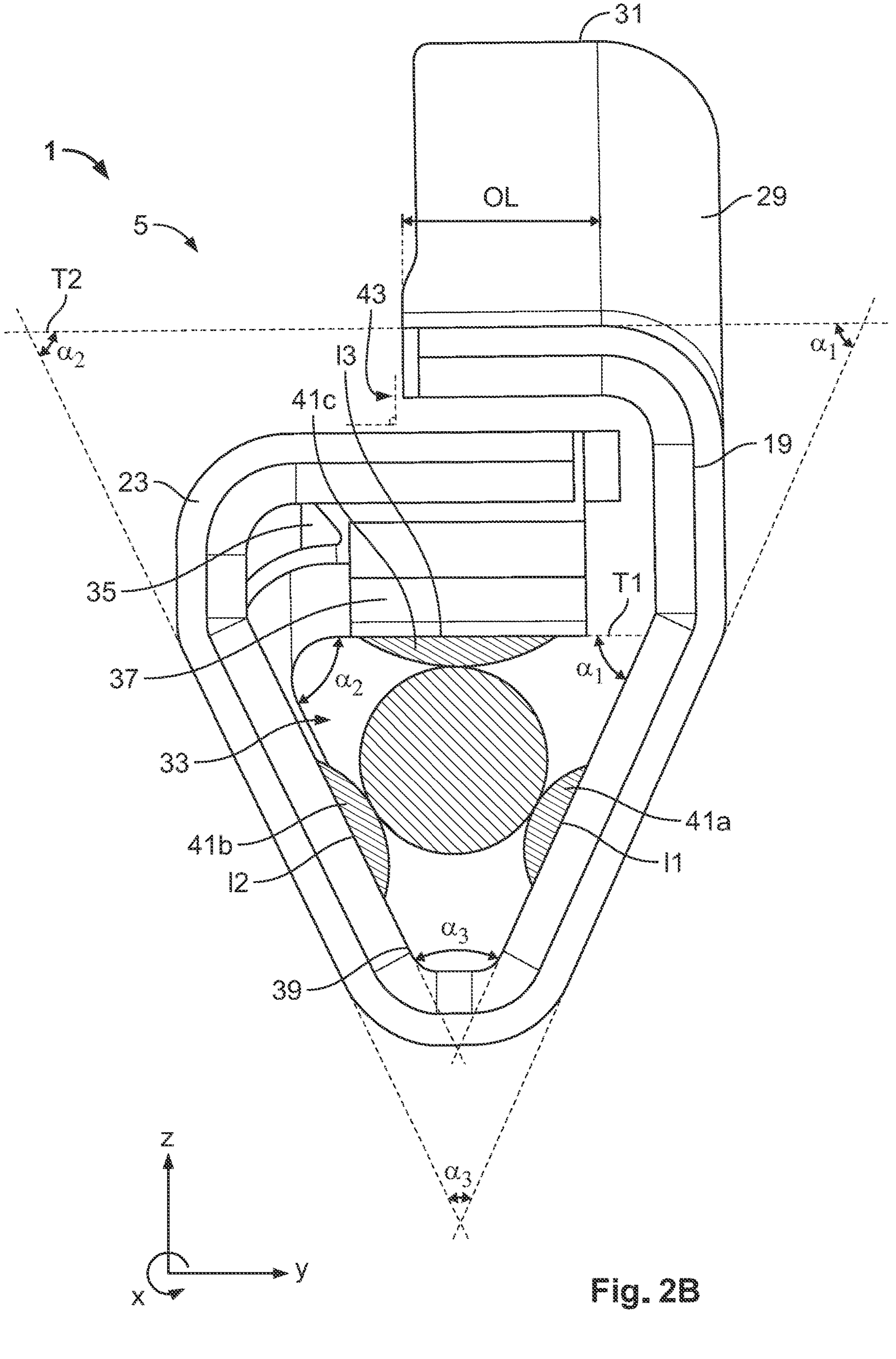
FIG. 2B shows a frontal view of an electrical contacting portion of the terminal socket of FIG. 2A in accordance with embodiments herein.

The main body 19 comprises a hollow space 33, which will be further described in relation to FIG. 2B. The second end 23 of the main body 19 comprises a spring element 35 extending from a fixation portion 36 of fixation to the main body 19, towards an extremity 37, along the mating direction x in the hollow space 33. The spring element 35 is a portion of the main body 19 that is bent away from the mating axis Ax, in particular bent away from the mating direction x partially towards a direction opposed to the direction z.

At the extremity of the main body 19 facing in the mating direction x, an opening 39 to the hollow space 33 is arranged to allow a mating terminal pin to be received in the hollow space 33 formed in the body 19. FIG. 2A illustrates in particular that the opening 39, the hollow space 33 and at least a portion P of the second end 23 of the main body 19 are triangularly shaped. Here the portion P of the second end 23 and the hollow space 33 are triangularly shaped in a cross-sectional plane A perpendicular to the mating direction x as illustrated in FIG. 2A. The plane A is perpendicular to the mating direction x and disposed in the portion P at a distance D from the opening 39, in a direction opposed to the mating direction x. The distance D has a value of less than 10% of the length of the hollow body 33 along the mating direction x.

In an area OL of the triangular external shape of the main body 19, the bent metallic sheet of overlaps. In particular, the metallic sheet constituting the main body 19 and forming the hollow space 33 is bent such that portion of a first end of the metallic sheet overlaps over a portion of a second of the metallic sheet. This will be further described with reference to areas OL' and OL" of FIG. 3 and respectively FIG. 4. The metallic sheet overlap realizes a step shape 43 in the external shape of the main body 19. The step shape 43 further contributes to the asymmetry of the external shape of the main body 19.

FIG. 2B shows a frontal view of the electrical contacting portion 5 of the terminal socket 1, as viewed in the direction opposed to the mating direction x. The cross-sectional view of FIG. 2B illustrates the locking lance 29 and its distal end 31, as well the spring element 35 and its extremity 37. For ease of understanding, FIG. 2B includes a schematic cross-section of the terminal pin 101 described in the following with reference to FIG. 2C, when introduced into the hollow space 33 of the terminal socket 1.

The extremity 37 of the spring element 35 is rounded facing inwards to the centre of the hollow space 33, so as to provide a defined contact area for the terminal pin with reduced degradation e.g. by chaffing.

The extremity 37 of the spring element 35 moves elastically upwards, that is in a direction z orthogonal to the mating direction x, from its resting position, when the pin 101 is inserted. The spring element 35 is pre-loaded to provide an improved mechanical load once a mating terminal pin 101 is received in the hollow space 33, as will be described further down. The mechanical load provides, together with the walls of the main body 19, a friction fit connection with the mating terminal pin 101.

As already indicated in relation to FIG. 2A, at least a portion P of the second end 23 of the main body 19 has a triangular external shape. In addition, at least a portion of the hollow space 33 is triangularly shaped.

FIG. 2B also illustrates that the hollow space 33 extends from the opening 39 throughout the main body 19. More specifically, FIG. 2B illustrates that in this embodiment, the entire hollow space 33 is triangularly shaped along the mating direction x, forming a triangle T1 having rounded corners α1, α2, α3 and lateral sides 11, 12, 13. The lateral sides 11 and 12 correspond to inward facing, or internal, surfaces of the main body 19, and 13 to an inward facing side of the extremity 37 of the spring element 35 of the main body 19. The lateral sides 11, 12, 13 also correspond to external circumferential sides of the hollow space 33.

Each lateral side 11, 12, 13 has a side length of less than 2 mm, preferably less than 1.5 mm and in particular less than 1 mm. The lateral side 13 corresponds to the extremity 37 of the spring element 35 and is adjacent to angles α1, α2. The lateral sides 11, 12 are adjacent to the angle α3.

The hollow space 33 is triangularly shaped so as to form an isosceles triangle, wherein 11 and 12 are equally long, and 13 is shorter than 11 and 12. In addition, angles α1, α2 are equal and larger than α3. However, each of the angles α1, α2, α3 is acute, i.e. smaller than 90°, and therefore the triangle formed by the hollow space 33 is also acute. According to a variant not represented in the figures, all three sides of the triangle can be of different lengths, thus leading to a scalene type triangular shape.

As the main body 19 is stamped from stock and thus consists of a single metallic monolithic body, the geometry of the hollow space 33, that is, the inner circumferential geometry of the main body 19, corresponds to the geometry of the external shape of the corresponding portion the main body 19. That is, the triangle T2 of the triangularly shaped portion of the second end 23 has the same angles α1, α2, α3, and is isosceles and acute in the same fashion.

On each one of the sides 11, 12, 13, a respective protruding bulge 41*a*, 41*b*, 41*c* is formed. The bulges 41*a*, 41*b*, 41*c*, of FIG. 2A, are preferably plated with a noble metal, e.g. silver or selenium, to reduce the contact resistance and improve the corrosion resistance. In an alternative embodiment, the entire terminal socket 1 is plated with a noble metal, or with layers of different metals for example, tin plating over a nickel undercoat.

Figure 1C:
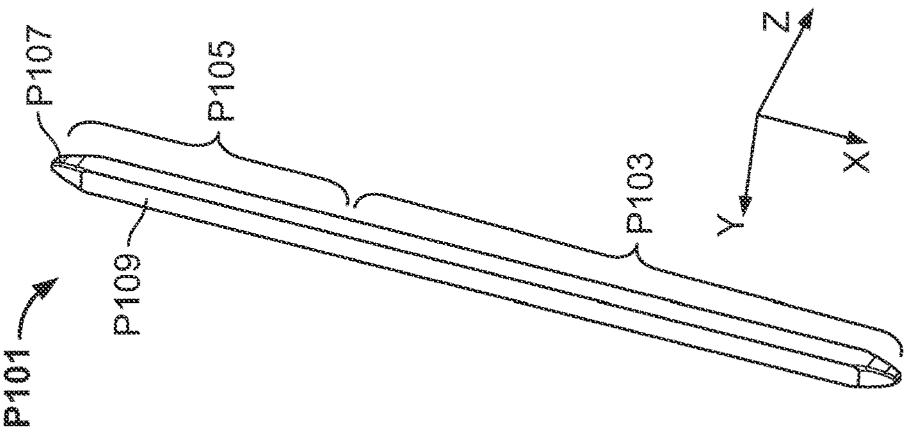
FIG. 1C shows a perspective view of a terminal pin known from prior art in accordance with embodiments herein.
Figure 1B:
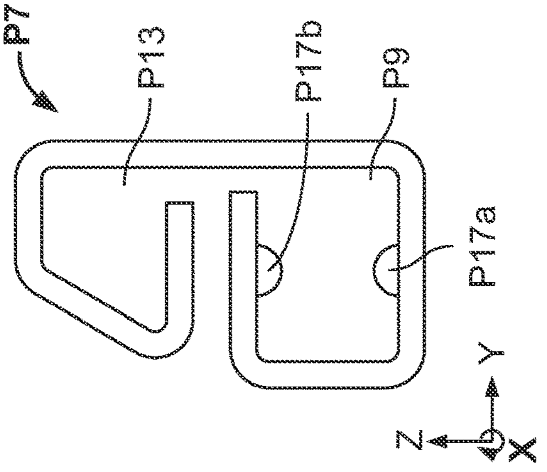
FIG. 1B shows a frontal view of an electrical contacting portion of the terminal socket of FIG. 1A in accordance with embodiments herein.
Figure 1A:
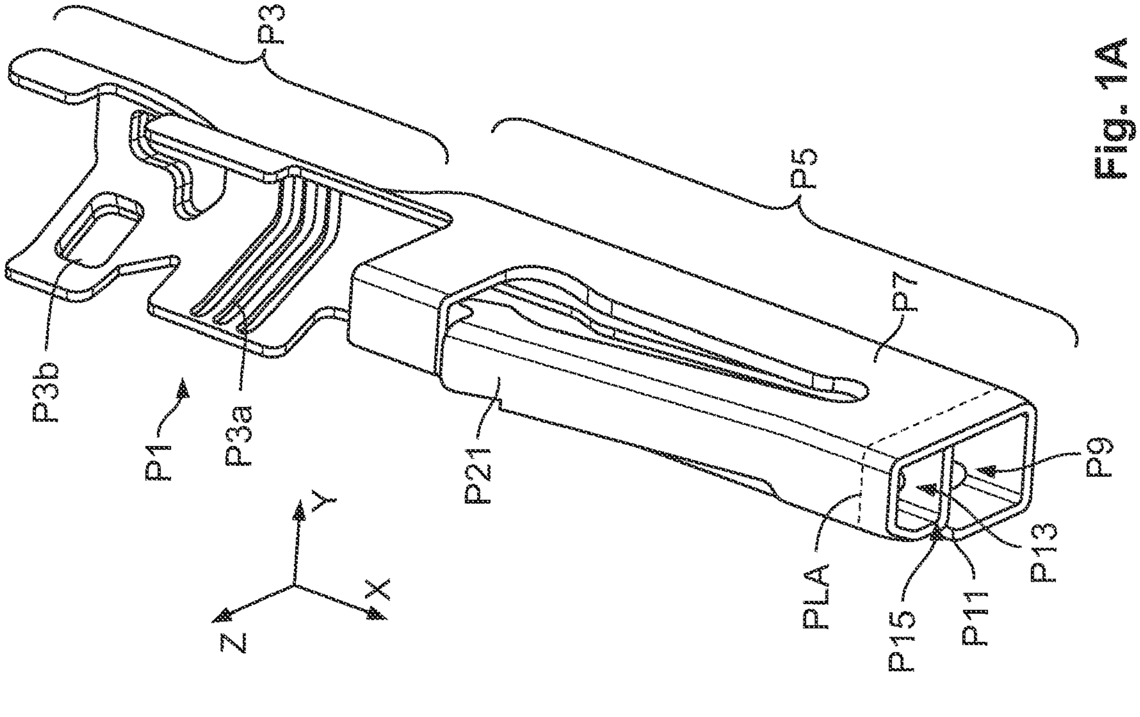
FIG. 1A shows a perspective view of a terminal socket known from prior art in accordance with embodiments herein.

The bulges allow the establishment of an the electrical contact with a mating terminal pin received through the opening 39 in the hollow space 33, on three sides and establishes a self-centring function of the terminal socket. That is, in contrast to a terminal pin received for example in a socket according to the prior art as illustrated in FIGS. 1A and 1B, the terminal pin received in the socket 1 will be centred between bulges 41*a* and 41*b* as the pin will be pushed against the bulges 41*a* and 41*b* by the spring element 35 and its bulge 41*c*. The dynamical load stability of the electrical contact connection is thus improved.

The external shape of the main body 19 of the terminal socket 1 is not twofold rotationally symmetric. Thus, it does not require a specific polarizing feature protrusion, such as the polarizing space P13 described in the Background Art section. Indeed, when merely a portion P of the external shape of the second end 23 of the main body 19 is triangular, it can no longer be inadvertently be rotated 180° about a centre axis and preserve the same shape. Thus, the risk of introducing the terminal socket 1 into a female connector housing wrongly or upside down can be mitigated.

This effect can be further enhanced, because the entire second end 23 of the main body 19 is triangular, and because the triangular shape of the main body 19 corresponds to an isosceles or scalene triangle. It can therefore only be introduced one way in a matching slot of a female header connector, as will be further illustrated in FIGS. 5A and 5B.

The terminal socket 1 according to the invention is compacter, i.e. smaller in size, lighter in weight, and requires less manufacturing material and fewer manufacturing steps in serial production, in particular when compared to prior art sockets such as terminal socket P1 as illustrated in FIG. 1A.

In the variant using the three bulges, the self-centring of an inserted terminal pin by the spring element 35 allows for improved dynamic load stability. For example, the triple-point engagement of an inserted mating terminal pin secures more robustly against vibrations along a direction y perpendicular both to the mating direction x and the direction z. Therefore, the risk of negative vibration-induced material wear, such as metal plating degradation and fretting corrosion, is reduced, thus also reducing overall contact resistance for improved electrical signalling.

Figure 2C:
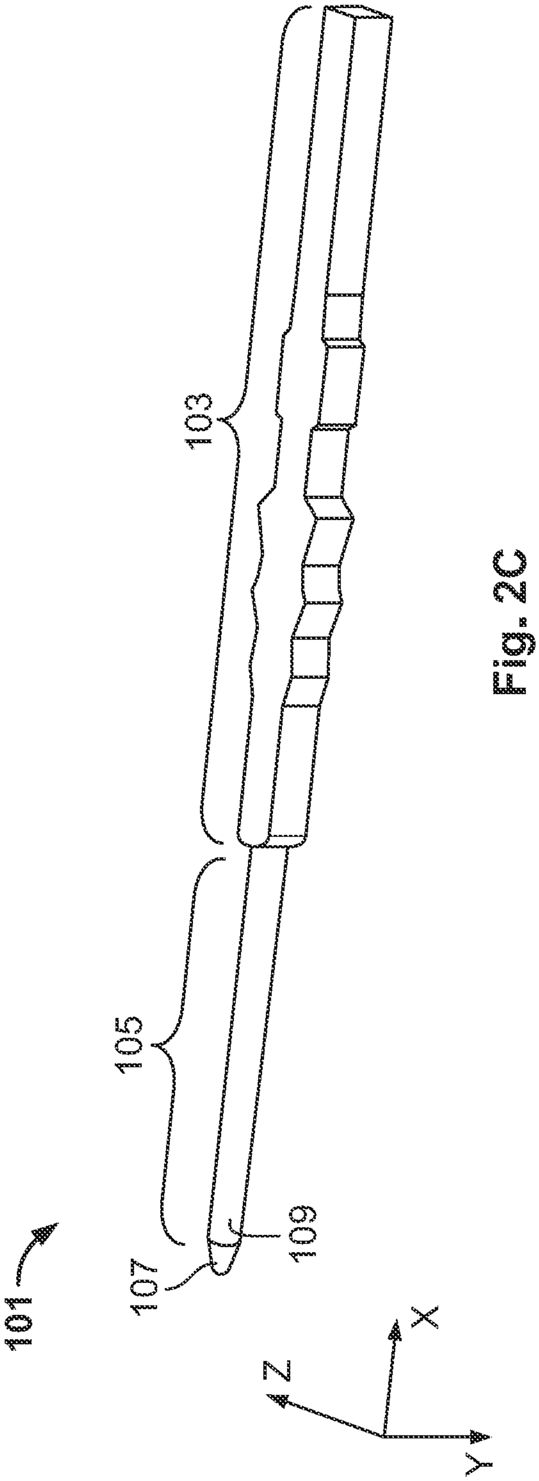
FIG. 2C shows a perspective view of a terminal pin for an electrical terminal system in accordance with embodiments herein.

FIG. 2C shows a perspective view of a terminal pin for an electrical terminal system according to an embodiment of the invention. The terminal pin 101 comprises a rear portion 103 to be connected to a wire and an electrical contacting portion 105 that is suited to be introduced into the terminal socket 1 to realize the electrical connection, as shown for in FIG. 2B. The rear portion 103 is connected to a wire or is used to establish connection on to a PCB. The electrical contacting portion 105 has the shape of a pointed cylinder. That is, the body 109 of the electrical contacting portion 105 is cylindrically shaped, with a circular cross-section in a plane perpendicular to the mating direction x, and comprises a pointed tip 107. As described with reference to FIG. 2B, the pin 101 is suited to be self-centred when introduced into the socket 1 and to be benefit from three contact points The terminal socket 1 and the terminal pin 101 of FIG. 2C form a terminal system according to a second embodiment of the invention. When the electrical contacting portion 105 is inserted by the tip 107 through the opening 39 in the hollow space 33, the electrical contact portion 105 is friction fit by the spring element 35 in the socket 1. An electrical contact is thus realized at least the contact portions between the bulges 41*a*, 41*b*, 41*c* and respective outer surface points of the cylindrical body of the electrical contact portion 105 of the terminal pin 101. Thus, a terminal system assembly according to an embodiment of the invention is realized.

Figure 3:
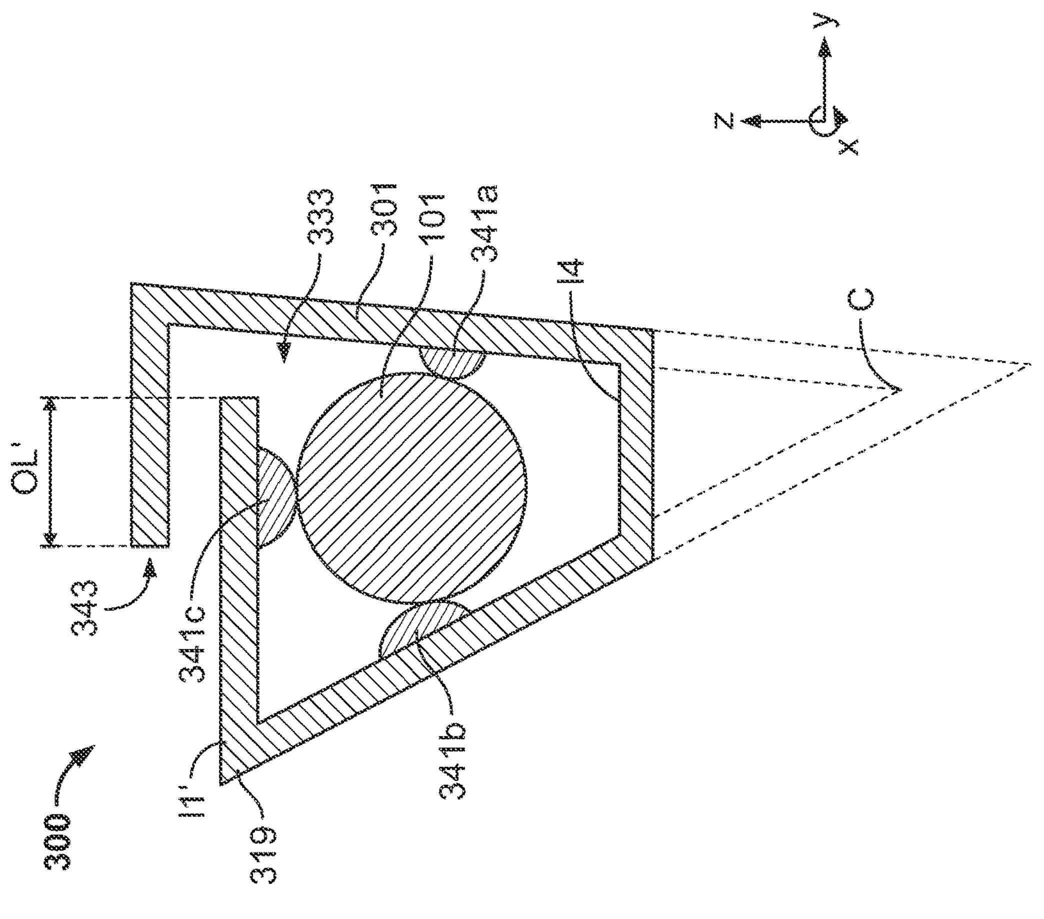
FIG. 3 shows a schematic view of a cross-section of a terminal system assembly in accordance with embodiments herein.

A third embodiment of the invention is described with reference to FIG. 3. FIG. 3 shows a schematic view of a cross-section of a terminal socket 301 according to the invention. The cross-section of FIG. 3 is a cross-section made in a plane perpendicular to the mating direction x, as in FIG. 2B A pin 101 as described with respect to FIG. 2C has been received through an opening of the terminal socket 301 to form a terminal system assembly 300 according to the invention. The only difference between the terminal socket 301 according to the third embodiment and the terminal socket 1 of the first embodiment is the shape of the cross section Indeed, the terminal socket 301 differs from the terminal socket 1 in that the external shape of the main body 319 in the cross-sectional plane is not triangular. Instead, the external shape corresponds to the shape of a "cropped" triangle, that is, a corner C of the triangle is replace by an additional side 14. The external shape of the main body 319 of the terminal socket 301 is thus not triangular anymore but trapezoidal, and the corresponding shape of the hollow space 333 is not triangular but trapezoidal as well. The terminal socket 301 is stamped from a metallic sheet or stock like in the first embodiment.

However, like for the first embodiment due to the external shape of the main body 319 not having a twofold rotational symmetry, the advantages of the invention in relation to a foolproofed insertion of the socket 301 into a female header connector are thus achieved as well. Indeed, in this embodiment, no polarizing space P13 as known in prior art is needed either.

The main body 319 defining and surrounding the hollow body 333 is bent such the stamped stock of the main body 319 overlaps over itself in an area OL' similar to the overlap area OL of the embodiment described in FIGS. 2A and 2B. The area OL' is a portion of the external shape of the main body 319 in which the stamped stock main body 301 is two-layered, instead of single-layered. In the embodiment of FIG. 3, the overlap area OL' extends along a side 11' of the four sides of the trapezoidal external shape of the main body. In particular, the overlap area OL' extends only fractionally along the side 11', that is between along 10 to 40% of the length of the side 11'. Therefore, a step shape 343 is formed on the external shape of the main body 319. Similarly to step shape 43, the step 343 formed by the overlap area OL' advantageously increases the asymmetry of the external shape and thus adds additional polarizing elements.

Besides the differences in shape, all other features and properties that are realized in the first embodiment are also present in the terminal socket 301 according to the third embodiment. For example, also in this embodiment the pin is engaged with the three bulges 341*a*, 341*b* and 341*c*. Additionally, in a different embodiment, a fourth bulge can be formed on an internal surface of the fourth side of the trapezoidal shape, for example on the additional lateral side 14.

Figure 4:
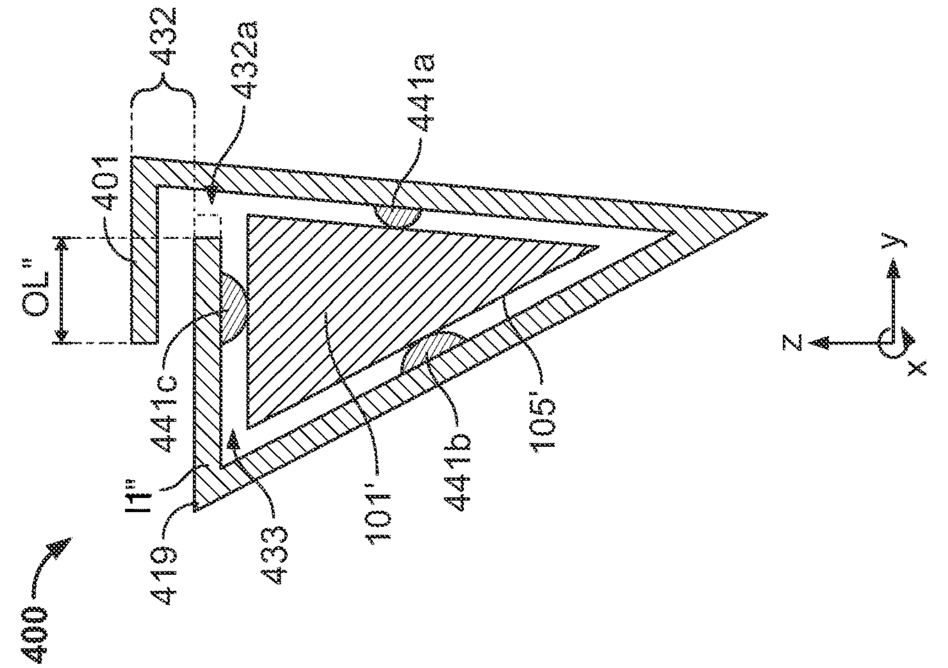
FIG. 4 shows a schematic view of a cross-section of a terminal system assembly in accordance with embodiments herein.

FIG. 4 illustrates a schematic view of a cross-section of a terminal system assembly 400 according to a fourth embodiment. FIG. 4 illustrates a terminal socket 401 with a main body 419 and a hollow space 433, into which a pin 101' has been received through an opening. The main body 419 further comprises an overlap area OL" corresponding to the overlap areas OL, OL'. The cross-section of FIG. 4 is also a cross-section in a plane perpendicular to the mating direction x like in FIG. 2B or FIG. 3

The terminal socket 401 differs from the terminal socket 1 of the first embodiment in that the external shape of the main body 419 in the cross-sectional plane is scalene. In addition, the terminal pin 101' has an electrical contacting portion that is not cylindrically shaped like in 101, but instead triangularly shaped, in particular triangularly shaped to match the cross-section of the hollow 433 of the main body 419. The terminal pin 101' is stamped from a metallic sheet or stock, in particular 0.4 mm stock and the electrical contacting portion 105' is formed to the suitable shape. However, in an alternative, the terminal pin 101' can be wiredrawn.

In the terminal system assembly 400, each side of the triangular electrical contacting portion 105 comprises a bulge 441*a*, 441*b*, 441*c* respectively. Thus, an electrical connection is established through three electrical contact portions formed by the bulges 441*a*, 441*b*, 441*c* like in the first embodiment.

In an alternative embodiment, a terminal system comprises the socket 1 of the first embodiment of the invention, and a terminal pin having an electrical contacting portion shape matching the shape of the hollow space 33 of the socket 1, that is, isosceles and acute.

In a further alternative embodiment, a terminal system comprises the socket 301 of the third embodiment, and a terminal pin having a trapezoidal electrical contacting portion matching with the shape of the hollow space 333 of the socket 301.

Besides the differences in shape, all other features and properties realized in the first to third embodiment are also realized by the terminal assembly 400 and/or terminal socket 401 according to the fourth embodiment.

In a variant of the invention, the area wherein the bent metallic sheets overlap is welded shut, that is, the bent metallic sheet extremities overlapping are welded together by laser beam welding. For example, in the fourth embodiment, the extremities of the bent metallic sheet overlapping in the area OL" are welded together. Similarly, in relation to the first and/or third embodiments, the areas OL and OL' respectively can be welded shut. As already indicated in relation to the rear bent portion 30 of FIG. 2A, the welding of the overlapping areas OL, OL', OL" can enhance structural cohesion of the sockets 1, 301, 401

In a related variant of the invention, described here with respect to the fourth embodiment illustrated in FIG. 4, the overlapping portion 432 of the socket body 419 can be fully omitted from the socket body design. In this variant, the side of the main body 419 comprising the overlapping area OL", in FIG. 4 corresponding to the lateral side 11" is elongated, that is, made longer. Thus, an area **432*a* is obtained in which the socket body 419 is welded shut, that is, wherein two extremities of the bent metallic sheet of the socket body 419 are welded together. For accuracy and reliability, the welding is preferably realized by laser beam welding. Thus, structural cohesion of the socket body 419** is improved, while at the same time reducing the total amount of socket body material required for manufacturing.

Each of the embodiments described in relation to FIGS. 2A to 4 have a shape for both the external shape of the main body and the hollow space for receiving a mating terminal pin that does not have a twofold rotational symmetry. In each case, the terminal sockets are therefore foolproof with respect mounting the terminal socket into a connector housing, without needing to utilize additional enlarging features such as polarizing spaces, guiding members, keying features, or the like, as known in prior art. Thus, the entire terminal socket and as a consequence the terminal system using such terminal socket can be further miniaturized.

In addition, having the same shape on the inside and the outside allows the use of a metal sheet, e.g. made of copper or aluminium, to obtain the terminal socket. The metal sheet can be bent into the desired shape. The sockets can thus be stamped from stock, which can be particularly cost-efficient.

Figure 5A:
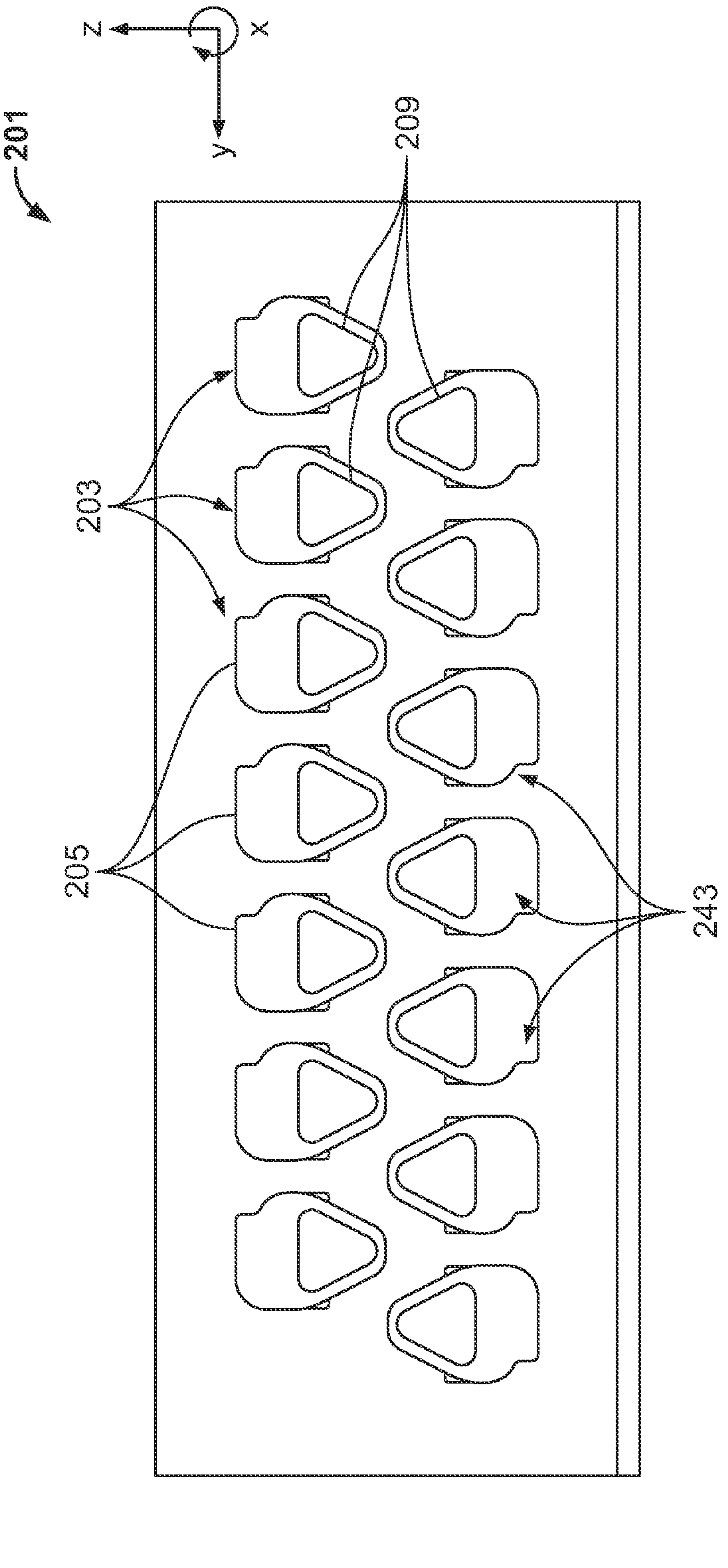
FIG. 5A shows a rear view of a female connector housing in accordance with embodiments herein.
Figure 5B:
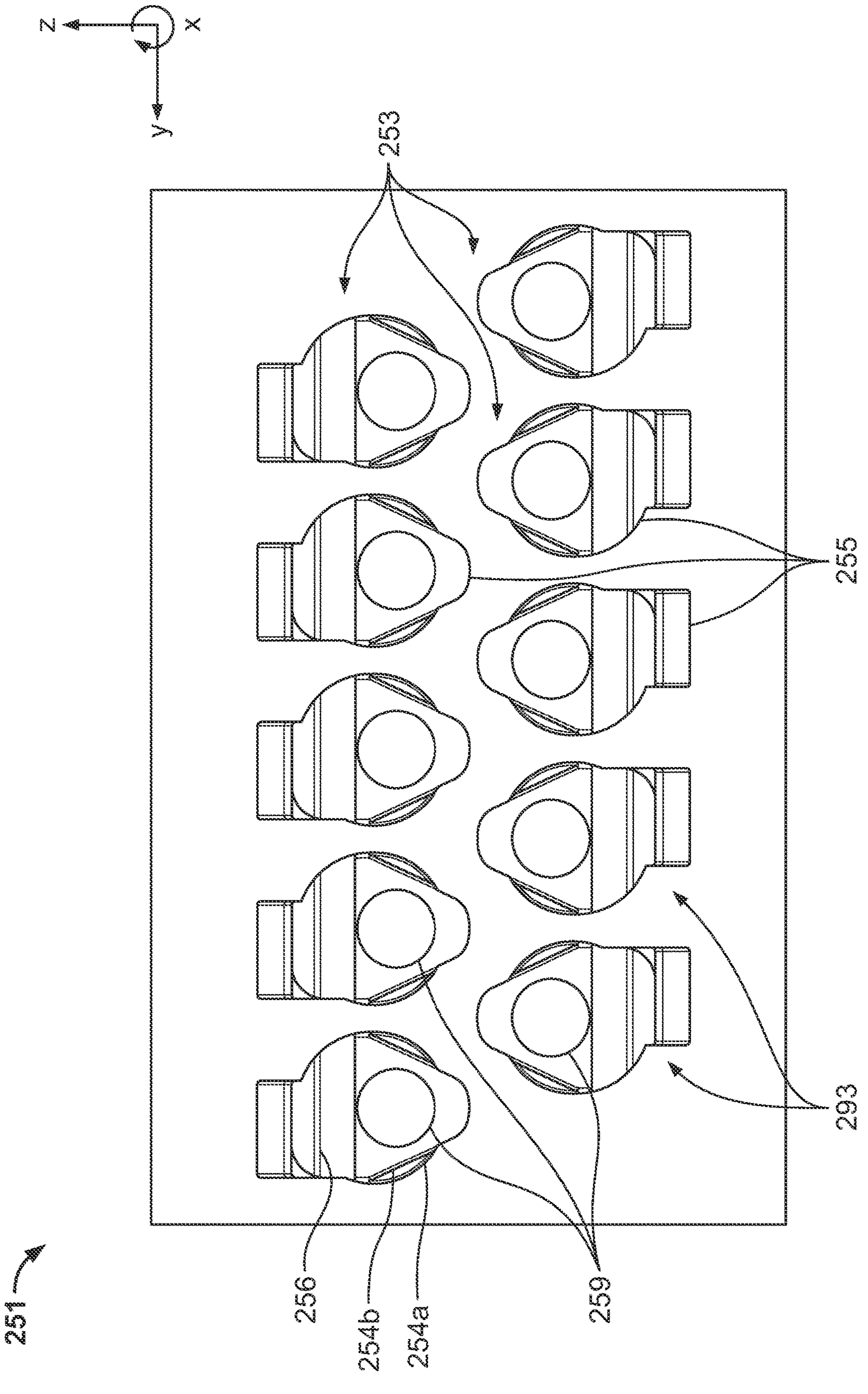
FIG. 5B shows a rear view of a female connector housing in accordance with embodiments herein.

FIGS. 5A and 5B show a rear view of a female connector housing 201, 251 according to a fifth and respectively a sixth embodiment of the invention. For example, the female connector housing 201, 251 can be a housing of a mobile connector for the connection of a flexible flat cable of a plurality of electrical conductors with a PCB. The female connector housing 201, 251 can in particular be configured to be connected with a male or pin header connector mounted on the PCB and comprising a plurality of terminal pins. The male header connector is mated with the front side of the connector housing 201, 251, that is, the side opposed to the rear side shown on FIGS. 5A and 5B.

The female connector housing 201 shown in FIG. 5A is provided with slots 203 for the terminal sockets 1 according to the first embodiment of the invention described hereabove. Inside the slots 203, terminal sockets 1 are accommodated. The slots 203 have rear openings 205 on the side shown on the rear view of FIG. 5A. The rear openings 205 have a shape configured to accommodate an external shape of the main body 19 of the terminal socket 1, including the triangularly shaped portion P of the external shape of the main body 19. In particular, a step shape 243 can match a step shape 43 of the terminal socket 1 and thus provide an additional rotational asymmetry.

In addition, the slots 203 comprise triangularly shaped front openings 209 for the mating side of the terminal socket 1, that is, the side facing in mating direction x at the opening 39 according to the first or fourth embodiment. The triangularly shaped front openings 209 are configured to receive the mating male terminal pins. In particular, the triangularly shaped front opening 209 is configured to receive a mating male terminal pin having a shape matching the shape of the front opening 209. The front opening is also configured to receive the terminal pin 101 described with respect to FIG. 2C and as shown on FIG. 2B. According to a variant, the shape of the front and back openings could also be adapted to the shape of the terminal sockets 301 or terminal socket 401, as described with respect to FIG. 3 and respectively FIG. 4, and according to the terminal pins used, for example terminal pin 101'. This is also illustrated in FIG. 5B described below.

Thus, even without the use of additional polarizing shapes, just by using a main body that has an external shape not showing a twofold rotational symmetry in a plane perpendicular to the mating direction, with a hollow space does not showing a twofold rotational symmetry in said plane, or when using a main body that has a triangular shape, the insertion of the sockets 1 in the slots 203 can be foolproofed, while at the same time achieving a simpler and more cost-efficient design.

The slots 203 for the sockets 1 are arranged in the connector housing 201 in two rows, wherein the orientation of triangular portions of the slots 203 of one row are turned by 180° with respect to the triangular shapes of the other row. That is, the sockets 1 accommodated in the slots 203 are rotated by 180° with respect to the terminal sockets of the neighbouring row of terminal sockets.

In addition, one row of sockets 1 or slots 203 is arranged in a staggered manner with respect to the neighbouring row. In this embodiment, the two rows are arranged in an alternating teeth fashion, wherein corners of the triangular portions of the slots intertwine, or mesh, in between each other. Thus, in one embodiment of the invention, a connector according to the invention can comprise the connector housing 201 and a plurality of sockets 1 inserted in the respective slots 203.

Figure 1D:
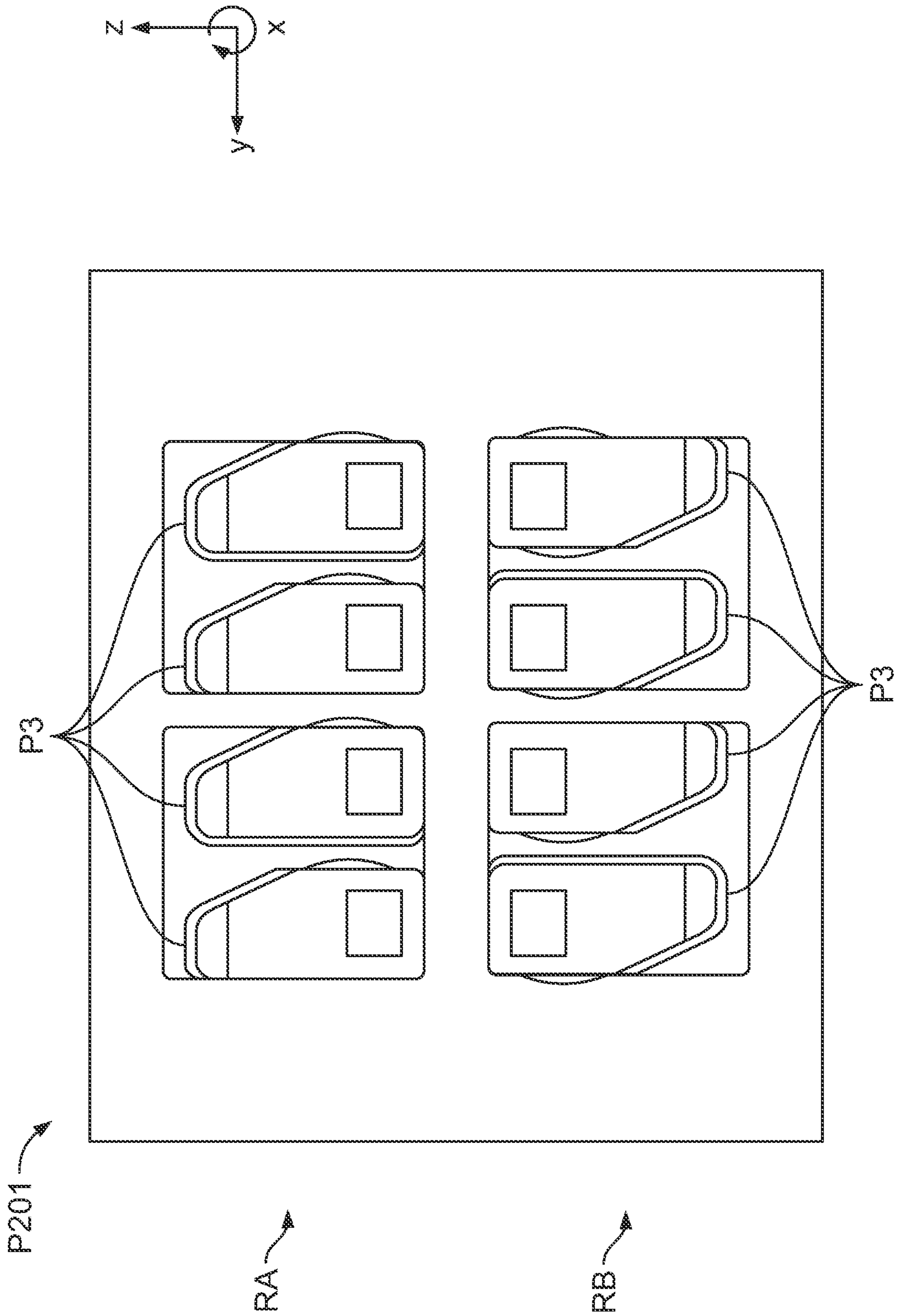
FIG. 1D shows a schematic rear view of a portion of a female header connector known from prior art in accordance with embodiments herein.

In comparison to the arrangement of FIG. 1D, it thus becomes possible to reduce the overall size of the female connector housing 201 by virtue of the shape and/or the staggered arrangement of the slots 203.

The sixth embodiment shown in FIG. 5B corresponds to further embodiment of a connector housing for connector according to the invention. Just like FIG. 5A, FIG. 5B shows a connector housing 251 having terminal socket slots 253 on the visible rear side of housing 251. Just like connector housing 201, the housing 251 is configured to receive terminal sockets 1 in the slots 253 through rear openings 255.

In contrast to FIG. 5A, FIG. 5B comprises more structural detail of the internal space of the slots 253. For example, FIG. 5B shows that the socket slots 253 comprise, along the mating direction x, a first portion 254*a* with a partially rounded outline, and a second portion with a fully triangular outline 254*b*. This allows a more convening first insertion stage of the sockets 1 in the housing 251, before stabilizing in the triangular second portion 254*b* of the slots 253.

In addition, FIG. 5B shows an internal rim 256, under which the locking lance 29 of a socket 1 can be elastically bent, and behind which, along the mating direction x, the extremity 31 of the locking lance 29 can lodged when the locking lance 29 returns to resting position. Thus is achieved the form fit locking of the socket 1 in the connector housing 251. Further, FIG. 5B shows just like FIG. 5A that the outline of the slots 253 comprises a step shape 293 to accommodate the locking lance 29 and obtain further asymmetry.

The connector 251 has the same staggered arrangement of two rows of slots 253 as described with reference to FIG. 5A, providing the same advantage of overall spatial requirement reduction. However, the connector housing 251 of the sixth embodiment differs from the connector housing 201 of the fifth embodiment with respect to the shape of the front openings 259. While the front openings 209 of connector housing 201 are triangularly shaped to accommodate triangularly shaped male pins, the front openings 259 are circularly shaped to accommodate the cylindrically shaped terminal pin 101 described with reference to FIGS. 2B and 2C.

With reference to FIGS. 2-5, various embodiments are disclosed providing terminal sockets having reduced in size compared to the prior art without compromising the design with respect to an unwanted wrongful upside down insertion of the terminal socket in the corresponding connector housing.

This object may be achieved with a terminal socket for an electrical terminal system, in particular an electrical terminal system for a printed circuit board connector system, configured to be mated with a terminal pin along a mating direction, and comprising a wiring portion and an electrical contacting portion, the electrical contacting portion comprising a main body the main body with a hollow space for receiving the mating terminal pin, characterized in that the main body has an external shape not showing a twofold rotational symmetry in a plane perpendicular to the mating direction, and in that the hollow space does not show a twofold rotational symmetry in said plane.

By choosing a shape for both the external shape of the main body and the hollow space for receiving a mating terminal pin that does not have a twofold rotational symmetry, an additional polarizing space like in the prior art can be omitted without losing a foolproof design for mounting the terminal socket into a header. Thus, the entire terminal socket and as a consequence the terminal system using such terminal socket can be further miniaturized. In particular, smaller terminal socket slots in a female connector housing can also reduce the overall size of the female connector, providing a female connector that is more compact and that requires less space. Hence, the mating PCB header can also be more compact.

One or more objects of the invention may also be achieved with a terminal socket for an electrical terminal system, in particular an electrical terminal system for a printed circuit board connector system, configured to be mated with a terminal pin along a mating direction, and comprises a wiring portion and an electrical contacting portion, the electrical contacting portion comprising a main body, the main body with a hollow space for receiving the mating terminal pin, characterized in that the main body has an external shape comprising a triangularly shaped portion, in particular triangularly shaped in a plane perpendicular to the mating direction.

By having an external shape comprising a triangularly shaped portion, the avoidance of a twofold rotational symmetry is achieved. Thus, a protruding polarizing feature is no longer necessary and can be omitted from the terminal socket design, while still providing at the same time a fool-proofed insertion into a female connector. This reduces the circumference and the cross-sectional dimensions of the terminal socket, and the female connector comprising terminal socket slots can be reduced in size, thus requiring less space. Correspondingly, the PCB header can also have reduced space requirements.

In one aspect of the invention, the hollow space can comprise a triangularly shaped portion, in particular a triangularly shaped portion in said plane. Having the same shape on the inside and the outside allows the use of a metal sheet, e.g. made of copper or aluminum, to obtain the terminal socket. The metal sheet can be bent into the desired shape. This simplifies the manufacturing process.

In one aspect of the invention, the hollow space can comprise three electrical contacting portions configured to engage with the mating terminal pin. Using three contact portions, whereas the prior art as illustrated in FIG. 1*b* only uses two, the contact resistance can be reduced. Thus the electrical signaling performance can be improved, while further increasing dynamic load stability of the assembled electrical terminal system.

In one aspect of the invention, the main body can comprise at least one bulge formed on an internal surface of the main body, the at least one bulge being configured to realize one of the three contacting portions. The use of at least one bulge increases the contact force on a mating contact pin once introduced into the socket.

In one further aspect, the main body can comprise three bulges, one bulge on each side of the triangular shape. Bulges formed in this configuration on the internal surfaces of the triangular shape can ensure there are three contacting points with the contact pin, and enhance the dynamic load stability of the terminal socket.

In one aspect of the invention, the electrical contacting portion can comprise a spring element arranged in the hollow space, wherein the spring element comprises the at least one bulge, in particular wherein the at least one bulge is configured to friction fit when a mating terminal pin is received in the hollow space. The spring element can thus improve the engagement of terminal socket and terminal pin, reducing the contact resistance and the improving the overall electrical connection.

In one aspect of the invention, the triangularly shaped portion of the main body can be acute. When the triangularly shaped portion is shaped with every angle smaller than to 90°, the corners of the triangle can be kept closer to the centre of the triangle. Therefore, the robustness and stability of the terminal socket are increased.

In one aspect of the invention, the triangularly shaped portion of the main body can be isosceles or scalene. In this geometry, the fool-proofing function of the shape is further improved, in particular in comparison to an equilateral triangle, as the threefold rotational symmetry is eliminated.

In one aspect of the invention, each lateral side of the triangularly shaped portion of the second end can have a side length of less than 2 mm, preferably less than 1.5 mm and in particular less than 1 mm. In this way, the socket can be dimensioned to be suited for miniature electrical terminal systems, such as electrical terminal systems for a PCB connector system or for other miniaturized connector systems. For example, the terminal socket can be suited for a PCB connector system used in an advanced driver assistance system (ADAS) for a motor vehicle.

In one aspect of the invention, the terminal socket can be stamped and bent from metallic sheets, in particular stamped from sheets having a thickness of less than 0.2 mm. Thus, a cost-efficient manufacturing method can be used, in particular to obtain terminal sockets for a miniaturized female connector of a PCB header connector system.

In one aspect of the invention, the triangularly shaped portion of the main body can comprises an area wherein the bent metallic sheet overlaps. This can add an additional asymmetric element to the cross-section of the triangular portion and thus enhance the polarizing feature of the terminal socket.

In one aspect of the invention, the triangularly shaped portion of the main body can comprise an area wherein the bent metallic sheet welded shut, in particular welded shut by laser welding. This can maintain or enhance the structural robustness and/or cohesion of the socket, while at the same time reducing the total amount of required socket body material. For example, bent areas dedicated to increasing socket cohesion can be omitted by instead welding extremities of socket body material together.

One or more objects of the invention may also be achieved with a terminal pin for mating with a terminal socket of an electrical terminal system, in particular for a printed circuit board connector system, in particular wherein the terminal socket according is a terminal socket according to any one of the above-described aspects. The terminal pin comprises an electrical contacting portion with a triangularly shaped portion configured to be received in the mating terminal socket, in particular wherein the triangularly shaped portion is a tip. By matching the cross section of the terminal pin with the cross section of the mating hollow space of the terminal socket, an improved self-centering and fitting of the pin is achieved. That is, the contact quality can be improved, while requiring reduced quantity of body material, for example of sheets of metals such as copper or aluminum, to manufacture the pin.

In one aspect of the terminal pin, the entire electrical contacting portion of the terminal pin is triangularly shaped. In this configuration, the entire electrical contacting portion of the pin that is configured to be received in the mating terminal socket is triangularly shaped and can therefore be advantageously produced in one step, for example, one stamping step or one wire drawing step, which would be cost efficient.

One or more objects of the invention may also be achieved with a terminal system comprising a terminal socket according to any one of the above-described aspects, and a mating terminal pin configured to be mated with the terminal socket, in particular wherein the mating terminal pin comprises an electrical contacting portion having the shape of a pointed cylinder Such a terminal pin can be formed from sheet metal after a stamping step, or from a machining process. This terminal system can benefit from the advantages of the inventive terminal socket described above without compatibility issues resulting from the use for conventional, for example standardized, rectangular cross-section terminal pins.

In one aspect of the terminal system, the mating terminal pin is a terminal pin according to one of the terminal pin aspects described above. Thus, the advantages of the terminal socket of the invention with the advantages of at least partially triangularly shaped pin can be combined. That is, the system can be more cost-efficient while at the same time providing improved contact properties and smaller spatial requirements as no additional polarization volume needs to be provided.

One or more objects of the invention may also be achieved with a terminal system assembly of a terminal system as described above, wherein each one of the three bulges of the terminal socket is engaged with the electrical contacting portion of the mating terminal pin. This terminal system assembly realizes the advantages of the self-centered terminal pin within the socket of the invention as also described above.

One or more objects of the invention may also be achieved with a header connector, comprising a plurality of terminal sockets, wherein at least one, preferably all, of the terminal sockets is a terminal socket according to one of the terminal socket aspects described above. Due to the more compact terminal socket, the overall size of the female connector can be reduced. The female connector thus takes less space compared to prior art connectors, for example in a PCB connector system or in an inline connector system.

In one aspect of the connector, the connector can comprise at least two rows of terminal sockets according to one of the terminal socket aspects described above, wherein the terminal sockets in one row are rotated by 180° with respect to the terminal sockets of the neighboring row of terminal sockets and wherein one row of terminal sockets is arranged in a staggered manner with respect to the neighboring row of terminal sockets. With a staggered arrangement of the terminal sockets in the connector, the volume of the connector can be even further reduced.

Although the embodiments have been described in relation to particular examples, the invention is not limited, and numerous alterations to the disclosed embodiments can be made without departing from the scope of this invention. The various embodiments and examples include individual features that can be freely combined with each other to obtain further embodiments or examples according to the invention.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A terminal socket for an electrical terminal system configured to be mated with a terminal pin along a mating direction, the terminal socket comprising:

a wiring portion and an electrical contacting portion, the electrical contacting portion including a main body with a hollow space for receiving the mating terminal pin, wherein the main body has an external shape having a triangularly shaped portion triangularly shaped in a plane perpendicular to the mating direction;

wherein the external shape of the main body not showing a twofold rotational symmetry in a plane perpendicular to the mating direction, and in that the hollow space does not show a twofold rotational symmetry in said plane;

wherein the main body is formed by bending a sheet metal, wherein the main body has a region in which a first end and a second end of the sheet metal overlap each other in a non-contact manner; and wherein the main body includes at least one bulge formed on an inner surface and extending into the hollow space for interface with the mating terminal pin.

2. The terminal socket according to claim 1, wherein the hollow space includes a triangularly shaped portion in said plane.

3. The terminal socket according to claim 1, wherein the hollow space includes three electrical contacting portions configured to engage with the mating terminal pin.

4. The terminal socket according to claim 3, wherein the at least one bulge defining at least one of the three contacting portions.

5. The terminal socket according to claim 3, wherein the at least one bulge of the main body comprises three bulges formed on the internal surface of the main body, one bulge on each side of the triangular shape.

6. The terminal socket according to claim 3, wherein the electrical contacting portion further comprises a spring element arranged in the hollow space, wherein the spring element comprises the at least one bulge, the at least one bulge is configured to be friction fit mated to the mating terminal pin when a mating terminal pin is received in the hollow space.

7. The terminal socket according to claim 1, wherein the triangularly shaped portion of the main body is acute.

8. The terminal socket according to claim 1, wherein the triangularly shaped portion of the main body is isosceles or scalene.

9. The terminal socket according to claim 1, wherein the terminal socket is stamped and bent from the metallic sheet having a thickness of less than 0.2 mm.

10. The terminal socket according to claim 9, wherein the triangularly shaped portion of the main body includes an area wherein the bent metallic sheet overlaps.

11. The terminal socket according to claim 9, wherein the triangularly shaped portion of the main body comprises an area wherein the bent metallic sheet is welded shut.

12. A terminal system comprising:

a terminal socket including a wiring portion and an electrical contacting portion, the electrical contacting portion including a main body with a hollow space, wherein the main body has an external shape having a triangularly shaped portion triangularly shaped in a plane perpendicular to the mating direction, wherein the external shape of the main body not showing a twofold rotational symmetry in a plane perpendicular to the mating direction, and in that the hollow space does not show a twofold rotational symmetry in said plane, wherein the main body is formed by bending a sheet metal, wherein the main body has a region in which a first end and a second end of the sheet metal overlap each other in a non-contact manner, and wherein the main body includes at least one bulge formed on an inner surface and extending into the hollow space; and a mating terminal pin received in the hollow space and configured to be mated with the terminal socket.

13. The terminal system according to claim 12, wherein the mating terminal pin includes an electrical contacting portion with a triangularly shaped portion configured to be received in the terminal socket.

14. The terminal system according to claim 13, wherein the entire electrical contacting portion is triangularly shaped.

15. The terminal system according to claim 12, wherein the mating terminal pin includes an electrical contacting portion having the shape of a pointed cylinder.

16. The terminal system according to claim 12, wherein the hollow space includes a triangularly shaped portion in said plane, the hollow space having three electrical contacting portions configured to engage with the mating terminal pin.

17. A connector comprising:

a connector housing having slots; and a plurality of terminal sockets received in the corresponding slots, each terminal socket including a wiring portion and an electrical contacting portion configured to be mated with a terminal pin along a mating direction, the electrical contacting portion including a main body with a hollow space for receiving the mating terminal pin, wherein the main body has an external shape having a triangularly shaped portion triangularly shaped in a plane perpendicular to the mating direction, wherein the external shape of the main body not showing a twofold rotational symmetry in a plane perpendicular to the mating direction, and in that the hollow space does not show a twofold rotational symmetry in said plane, wherein the main body is formed by bending a sheet metal, wherein the main body has a region in which a first end and a second end of the sheet metal overlap each other in a non-contact manner, and wherein the main body includes at least one bulge formed on an inner surface and extending into the hollow space.

18. The connector according to claim 17, wherein the slots are arranged in at least two rows to hold the terminal sockets in at least two rows of terminal sockets, wherein the terminal sockets in one row are rotated by 180° with respect to the terminal sockets of the neighboring row of terminal sockets and wherein one row of terminal sockets is arranged in a staggered manner with respect to the neighboring row of terminal sockets.

19. The connector according to claim 17, wherein the hollow space includes a triangularly shaped portion in said plane, the hollow space having three electrical contacting portions configured to engage with the mating terminal pin.

* * * * *